United States Patent
Fréchette

(10) Patent No.: US 9,701,485 B2
(45) Date of Patent: Jul. 11, 2017

(54) U-SHAPED BOARD UNSCRAMBLER

(71) Applicant: Carbotech International, Plessisville (CA)

(72) Inventor: Denis Fréchette, Tingwick (CA)

(*) Notice: Subject to any disclaimer, the term of this patent is extended or adjusted under 35 U.S.C. 154(b) by 0 days.

(21) Appl. No.: 15/097,754

(22) Filed: Apr. 13, 2016

(65) Prior Publication Data
US 2016/0297620 A1    Oct. 13, 2016

Related U.S. Application Data

(60) Provisional application No. 62/146,741, filed on Apr. 13, 2015.

(51) Int. Cl.
*B65G 15/44*    (2006.01)
*B65G 19/22*    (2006.01)
*B65G 47/14*    (2006.01)

(52) U.S. Cl.
CPC ......... *B65G 47/1471* (2013.01); *B65G 15/44* (2013.01); *B65G 19/225* (2013.01); *B65G 47/1492* (2013.01); *B65G 2201/0282* (2013.01)

(58) Field of Classification Search
CPC .... B65G 19/22; B65G 47/1492; B65G 47/28; B65G 2201/0282; B65G 47/1471; B65G 19/02; B65G 19/225; B65G 23/06
See application file for complete search history.

(56) References Cited

U.S. PATENT DOCUMENTS

| | | | | |
|---|---|---|---|---|
| 2,679,919 A | * | 6/1954 | De Koning | B27B 25/04 198/459.5 |
| 3,162,292 A | * | 12/1964 | Lawson | B65G 47/1471 144/245.1 |
| 3,190,433 A | * | 6/1965 | Blaukschein, Jr. | B65G 47/1471 193/44 |
| 3,771,641 A | * | 11/1973 | Jonsson | B65G 47/1492 198/396 |
| 3,835,985 A | * | 9/1974 | Johnson | B65G 47/1471 198/397.06 |
| 4,909,375 A | * | 3/1990 | Cotic | E01B 29/32 198/393 |
| 5,363,950 A | * | 11/1994 | Lacuna | B65G 47/1492 198/382 |

(Continued)

FOREIGN PATENT DOCUMENTS

| CA | 2148322 | 9/1998 |
|---|---|---|
| CA | 2185609 | 6/2000 |
| CA | 2151768 | 12/2002 |

*Primary Examiner* — Mark A Deuble
(74) *Attorney, Agent, or Firm* — Benoit & Cote, Inc.; C. Marc Benoit

(57) ABSTRACT

A board unscrambler for sorting a plurality of boards comprises a frame having an entrance and an exit. The frame comprises a U-shaped accumulator near the entrance and an upwardly substantially longitudinal slope connecting the U-shaped accumulator portion to the exit. The board unscrambler further comprises a powered conveyor which substantially adopts the shape of the frame, comprising driving chains and a plurality of spaced apart catches mounted on the driving chains for mating with and displacing the boards along the frame from the U-shaped accumulator portion toward the exit. Accordingly, the board unscrambler features accumulation capability, thereby increasing efficiency and regulating performance.

19 Claims, 15 Drawing Sheets

(56) References Cited

U.S. PATENT DOCUMENTS

| | | | |
|---|---|---|---|
| 5,439,093 A * | 8/1995 | Drewitz | B65G 47/1471 198/397.06 |
| 6,257,393 B1 * | 7/2001 | Phelps | B65G 47/1471 198/397.01 |
| 6,401,906 B1 | 6/2002 | Franz et al. | |
| 7,743,904 B2 * | 6/2010 | Monti | B65G 47/1471 198/395 |
| 2003/0024858 A1 * | 2/2003 | Stibbard | B65G 19/02 209/517 |
| 2013/0233677 A1 * | 9/2013 | Deflandre | B65G 15/44 198/690.2 |

* cited by examiner

U-SHAPED BOARD UNSCRAMBLER

CROSS-REFERENCE TO RELATED APPLICATION

This application claims priority from U.S. patent provisional application 62/146,741 filed Apr. 13, 2015, the specification of which is hereby incorporated herein by reference in its entirety.

BACKGROUND (a) Field

The subject matter disclosed generally relates to systems for sorting or unscrambling boards and to methods of operating the same.

(b) Related Prior Art

Lumber manufacturing nowadays has become increasingly competitive to a point where its operations must be automated as much as possible for economic viability of the manufacturing process.

In automating various lumber processing machinery, it is often necessary to receive an agglomerated supply of scrambled elongated boards, having longer dimensions extending somewhat in the same general direction, and turn the longitudinal boards to a uniform parallel attitude while singulating them, individually, or in small groups, in adjacency or at discrete intervals for delivery to other devices, machines, machineries or components for further processing. Machines accomplishing this function are commonly known in the lumber industry as board unscramblers, board sorters, unscrambling devices or unscramblers.

There exists on the market a plurality of apparatuses for unscrambling boards.

U.S. Pat. No. 6,401,906, to Franz et al., describes a S-shaped board unscrambler for lumber processing. The efficiency of such an apparatus is not optimal.

According to another example, and referring now to PRIOR ART FIG. 1, there is shown a V-shaped board unscrambler for lumber processing. The efficiency of such an apparatus is not optimal.

There is therefore a need for improved board unscramblers for sorting a plurality of boards that overcome the prior art drawbacks and that allows for improved efficiency of the sorting process of the boards.

SUMMARY

According to an embodiment, there is disclosed a board unscrambler adapted for unscrambling boards comprising: a frame having an entrance and an exit for the boards, the frame comprising: a U-shaped accumulator portion in which the boards accumulate after the entrance; and an upward slope portion between the U-shaped accumulator portion and the exit; and a powered conveyor comprising catches for carrying forward the boards along the frame from the U-shaped accumulator portion through the upward slope portion toward the exit; wherein boards which are not directly or indirectly carried forward by the catches will fall back in the U-shaped accumulator portion thereby resulting in an unscrambling of the boards which are carried forward.

According to an aspect, the upward slope portion is substantially longitudinal.

According to an aspect, the upward slope portion comprises a curved portion.

According to an aspect, the upward slope portion is a direct and immediate continuation of the U-shaped accumulator portion.

According to an aspect, the upward slope portion forms part of and is integrated with the U-shaped accumulator portion.

According to an aspect, the catches have a substantial longitudinal shape having a longitudinal direction which is substantially parallel to the boards.

According to an aspect, the powered conveyor comprises driving chains to which the catches are mounted wherein the driving chains are parallel to each other and in a direction which is perpendicular to the entrance and the exit wherein the entrance and the exit extends laterally and are substantially parallel to each other.

According to an aspect, the catches mounted on respective ones of the driving chains are horizontally aligned.

According to an aspect, the catches have a substantial longitudinal shape having a longitudinal direction which is substantially parallel to the boards and the catches are mounted across more two or more driving chains.

According to an aspect, the powered conveyor further comprises a drive shaft and geared wheels which are spaced apart on the drive shaft, and wherein the driving chains ride on the geared wheels.

According to an aspect, the frame comprises a rail along which the driving chains travel.

According to an aspect, the board unscrambler further comprises a motor driving the powered conveyor.

According to an aspect, the motor driving the powered conveyor is connected to the drive shaft thereby driving the geared wheels.

According to an aspect, the U-shaped accumulator portion has a radius of curvature R of about between 0.1 meters and 3 meters.

According to an aspect, the entrance is at a first elevation, and the exit is at a second elevation, and wherein the second elevation is greater than the first elevation.

According to an aspect, the upward slope portion defines an angle of about between 40° and 80° relative to the horizontal.

According to an aspect, comprising sensors for monitoring boards on the powered conveyor.

According to an embodiment, there is disclosed a method of unscrambling boards comprising: providing boards perpendicularly to a forward direction of movement of the boards; accumulating boards in a U-shaped accumulator; and a conveyor catching at least some boards for carrying them forward on an upward slope still perpendicularly to a forward direction of movement of the boards; wherein boards which are not directly or indirectly carried forward by the catches will fall back from the upward slope or remain in the U-shaped accumulator thereby resulting in an unscrambling of the boards which are carried forward.

According to an embodiment, there is disclosed a board unscrambler adapted for unscrambling boards comprising: a U-shaped accumulator in which the boards accumulate after entering the board unscrambler; an upward slope after the U-shaped accumulator; and a powered conveyor comprising catches for carrying forward the boards from the U-shaped accumulator through the upward slope; wherein boards which are not directly or indirectly carried forward by the catches will fall back from the upward slope or remain in the U-shaped accumulator thereby resulting in an unscrambling of the boards which are carried forward.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In embodiments there are disclosed board unscramblers, also commonly known as board sorters, unscrambling devices or unscramblers, for sorting or unscrambling a plurality of boards and methods of operating the same.

It has to be noted that the embodiments, geometrical configurations, materials mentioned and/or dimensions shown in the figures or described in the present description are preferred embodiments only, given for exemplification purposes only.

Throughout the present document, expressions such as "conveying", "transferring", "displacing", "wood board", "lumber", "mill", etc., used herein should not be taken as to limit the scope of the present invention and include all other kinds of objects or fields with which the present invention could be used and may be useful.

Moreover, in the context of the present invention, the expressions "system", "assembly", "unit", "device" and any other equivalent expression and/or compound words thereof known in the art will be used interchangeably. Furthermore, the same applies for any other mutually equivalent expressions, such as "wood board", "board", "lumber", "elongated piece of lumber", "log", "plank" and the like, "sorting", "unscrambling", "arranging", "straightening" and the like, as well as "segment", "portion" and "section", for example, as also apparent to a person skilled in the art. Furthermore, and also in the context of the present description, the expressions "align", "orientate", "place" and "space" may also be used interchangeably, as well as "finger", "stop wedge" and "stopper", or even "second" and "subsequent", as also apparent to a person skilled in the art.

Figure 1:
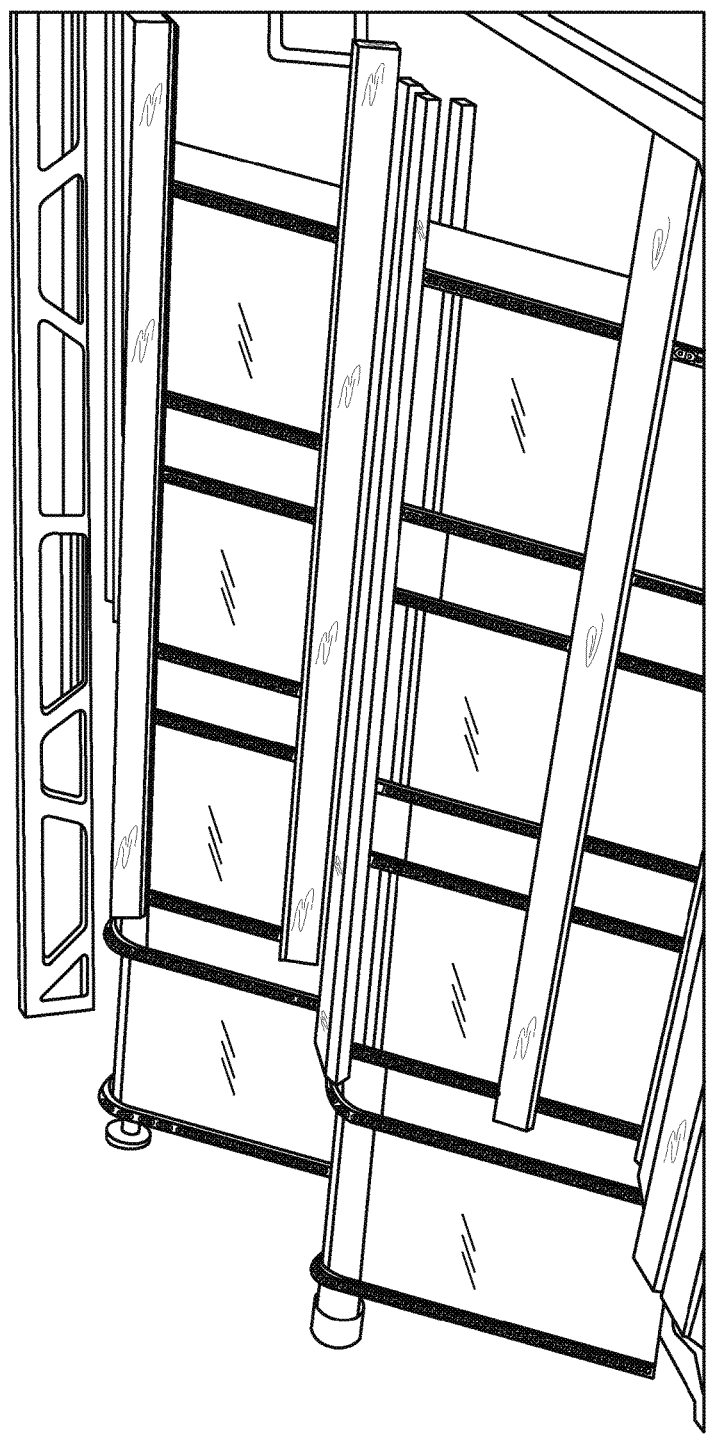
FIG. 1 is a picture showing a V-shaped board unscrambler in accordance with the PRIOR ART.
Figure 2:
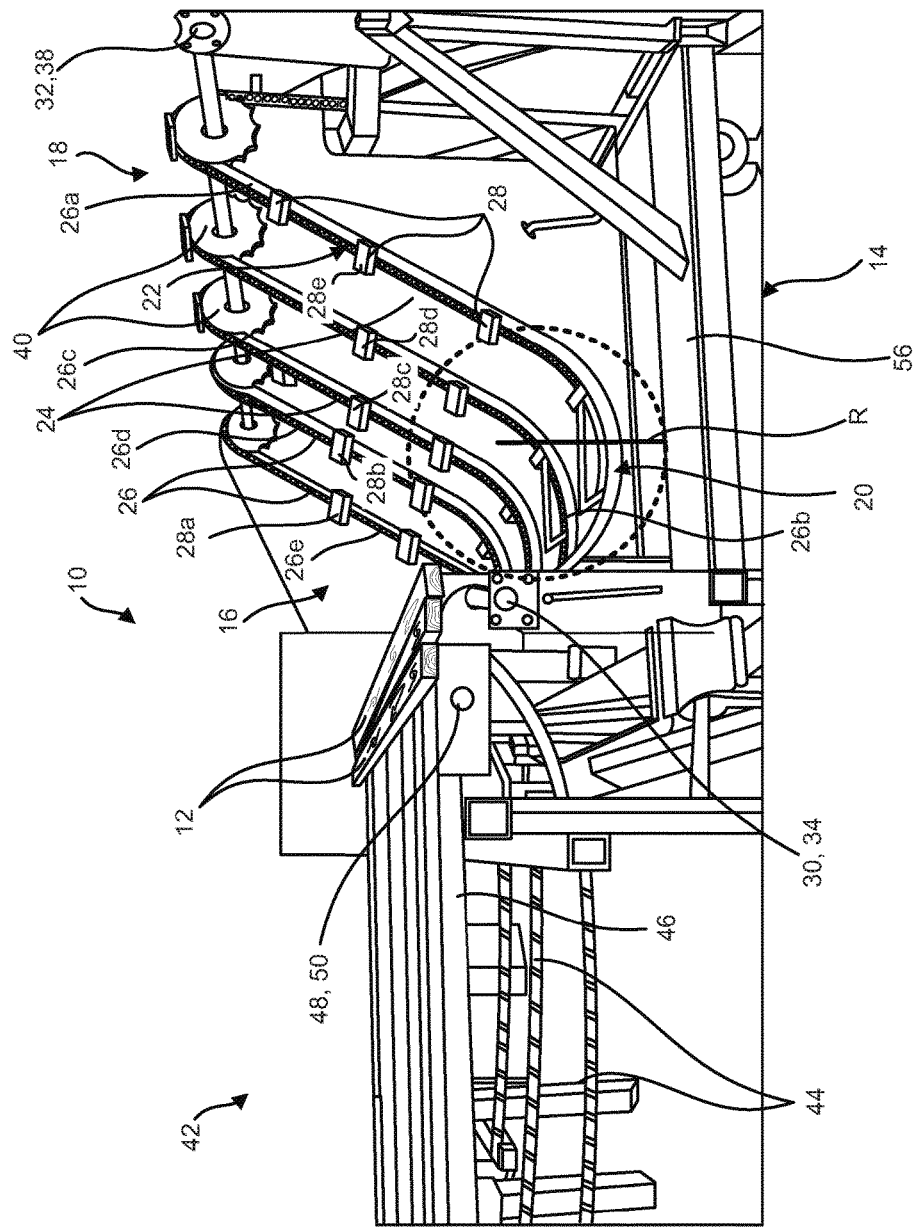
FIG. 2 is a picture showing a board unscrambler in accordance with an embodiment.

Referring now to the drawings, and more particularly to FIG. 2, there is shown a board unscrambler 10 for sorting a plurality of boards 12. The board unscrambler 10 includes a frame 14 which defines an entrance 16 and an exit 18. According to an embodiment, the entrance 16 is at a first elevation, and the exit 18 is at a second elevation, and wherein the second elevation is greater than the first elevation.

The frame 14 of the board unscrambler 10 includes a U-shaped accumulator portion 20 near and below the entrance 16 and an upward slope portion 22 after and generally above the U-shaped accumulator portion 20 towards the exit 18. According to an embodiment, the upward slope portion 22 is substantially longitudinal or at least comprises a substantially longitudinal portion. According to another embodiment, the upward slope portion 22 comprises a curved portion.

The board unscrambler 10 further includes a conveyor 24 (aka a powered conveyor) which substantially adopts the shape of the frame 14. The conveyor 24 comprises driving chains 26 for conveying boards 12 about the frame 14 in a travel or forward direction that is substantially perpendicular to the boards 12. A plurality of regularly spaced apart stop wedges 28 are mounted on the driving chains 26. The term "wedges" here is used in the sense that they are used to create a separation between boards or groups of boards while the conveyor 24 drives the wedges forward on the conveyor 24. While the present description discusses stop wedges 28, it is understood that other types of wedges (such as catches, hooks, gaps, lips, chocks, chucks, stops, blocks, etc.) capable of carrying forward the boards 12 could also be incorporated in the present design.

According to an embodiment the catches (stop wedges 28) have a substantial longitudinal shape having a longitudinal direction which is substantially parallel to the boards. Furthermore, the catches comprise a top longitudinal side and a bottom longitudinal side opposite the top longitudinal side, wherein the top longitudinal side interfaces with the boards 12 and carries the boards 12 forward.

When the plurality of boards 12 are received on the conveyor 24, within the U-shaped accumulator portion 20, at least one board 12 from the plurality of boards 12 that are in contact with the conveyor 24 engages with one stop wedge 28 from the plurality of regularly spaced apart stop wedges 28 and is displaced on the slope portion 22 towards the exit 18. The purpose of the U-shaped accumulator portion 20 after or near the entrance 16 is to receive and to accumulate a plurality of boards 12 that are falling from an upstream conveyor 42 passed the entrance 16 in a way such as to allow only the boards 12 that are following the conveyor surface 29 of the conveyor 24 (that are on the conveyor surface 29 of the conveyor 24) in the U-shaped accumulator portion 20 to be displaced by the plurality of regularly spaced apart stop wedges 28 towards the slope portion 22.

The frame 14 includes a base 56 for supporting the board unscrambler 10 on the ground surface.

As shown in FIG. 2, the conveyor 24 comprises the driving chains 26, specifically a plurality of parallel driving chains 26a, 26b, 26c, 26d, 26e allowing the plurality of boards 12 to be sorted and driving the boards 12 over the conveyor surface 29. Stop wedges 28 are mounted on the driving chains 26 of the same length, at similar position, resulting in having stop wedges 28 at the same elevation for each driving chains 26a, 26b, 26c, 26d, 26e. The stop wedges 28 can be mounted on a single driving chain 26 or across multiple driving chains 26 depending on their chosen length. The outcome is a board unscrambler 10 able to keep the boards 12 horizontal when displacing the boards 12.

Figure 14:
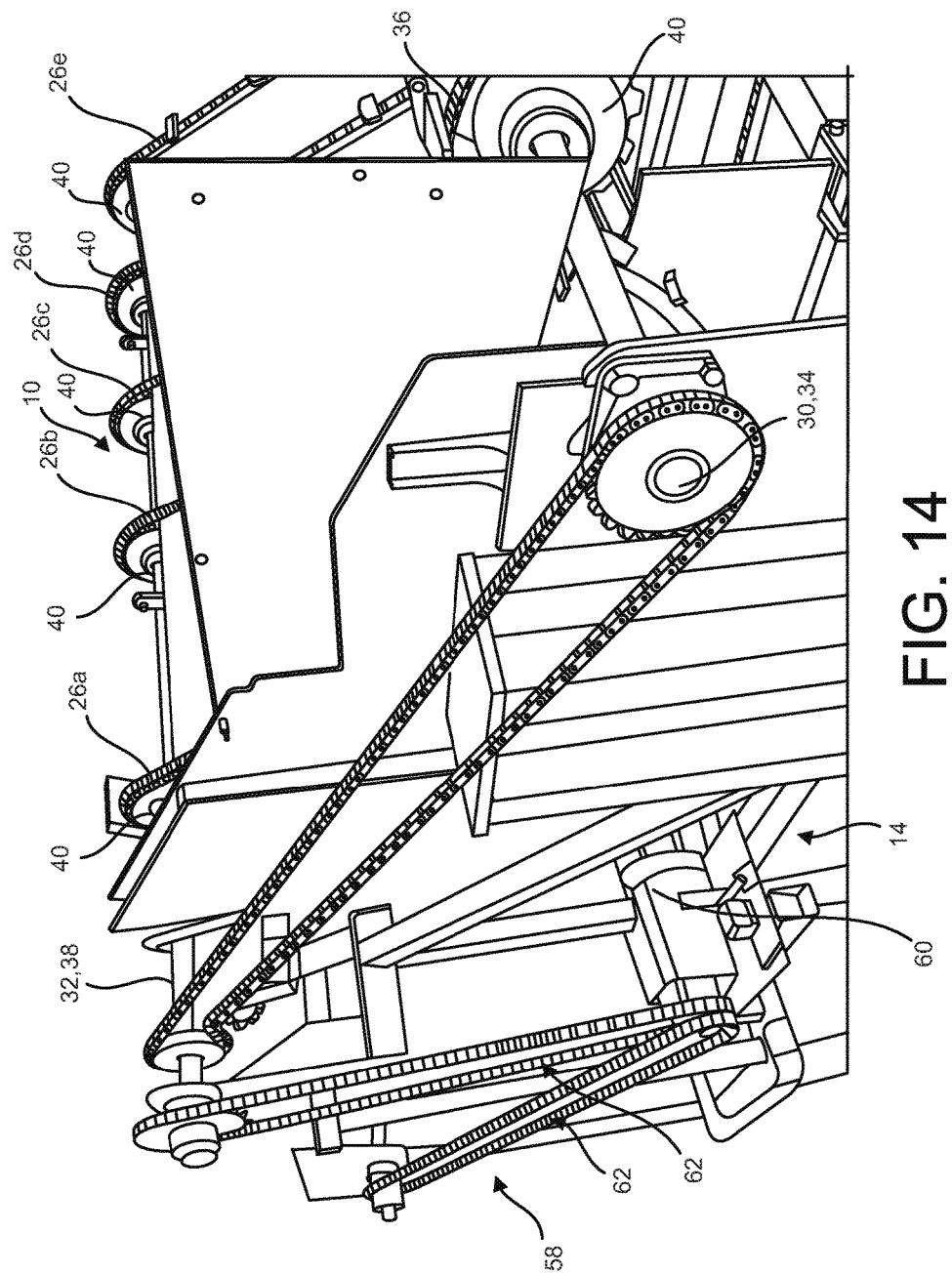
FIGS. 14-15 are pictures showing the motor and chain assembly driving the board unscrambler according to an embodiment.
Figure 15:
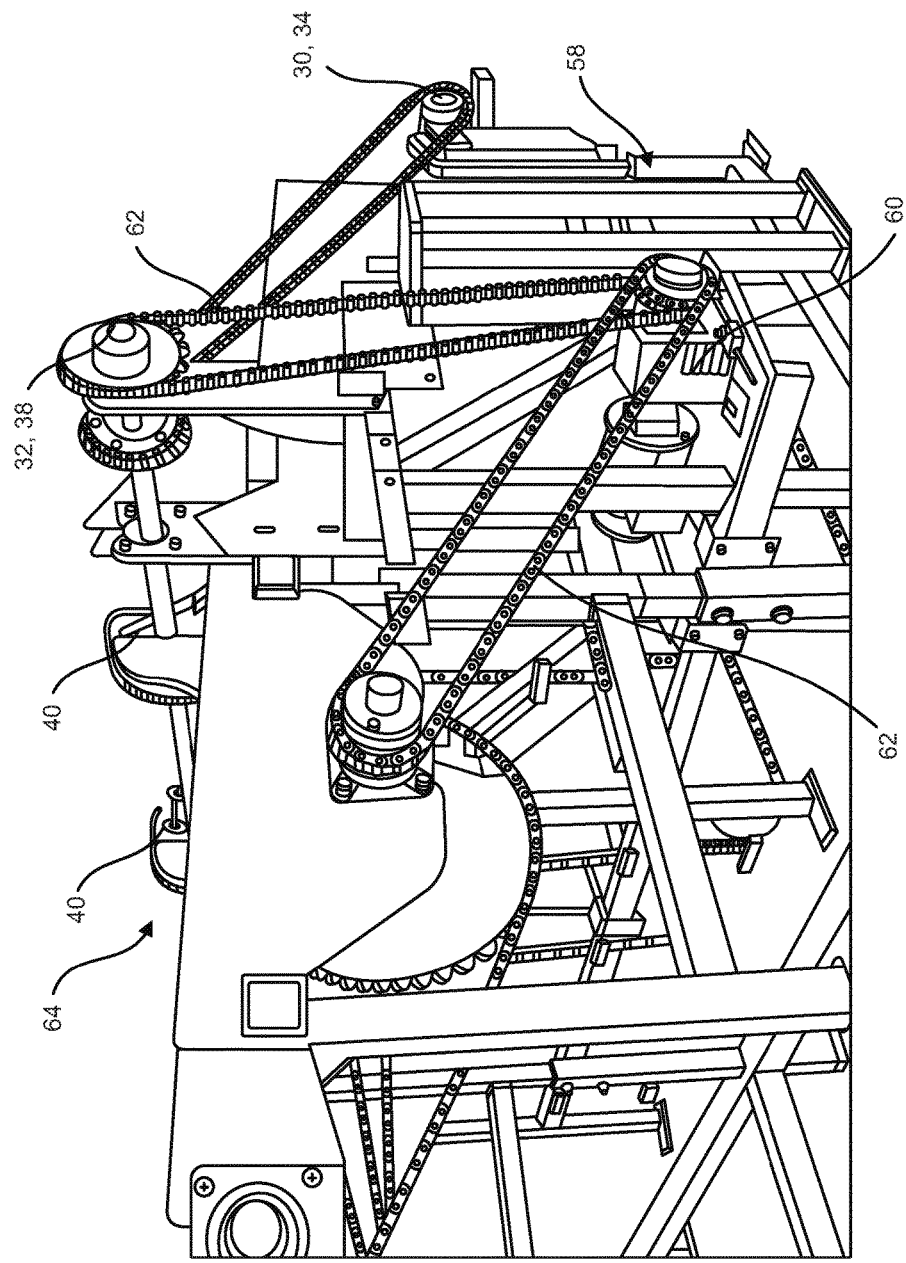

Now also referring to FIGS. 14-15, the plurality of driving chains 26 (driving chains 26a, 26b, 26c, 26d, 26e shown in FIG. 2) are powered by a driving mechanism 58. The driving mechanism 58 comprises a motor 60, a first drive shaft 30 about the entrance 16 and a second drive shaft 32 distant from the first drive shaft 30 and about the exit 18. The first and second drive shafts 30, 32 are in driving arrangement/engagement with the motor 60 through shaft-driving chains 62. The first drive shaft 30 defines a first axis 34 on which are mounted a plurality of first geared wheels 36 while the second drive shaft 32 defines second axis 38 on which are mounted a plurality of second geared wheels 40. The plurality of first geared wheels 36 and the plurality of second geared wheels 40 respectively rotate about the first and second axis 34, 38 for meshing with the plurality of driving chains 26a, 26b, 26c, 26d, 26e.

Figure 13:
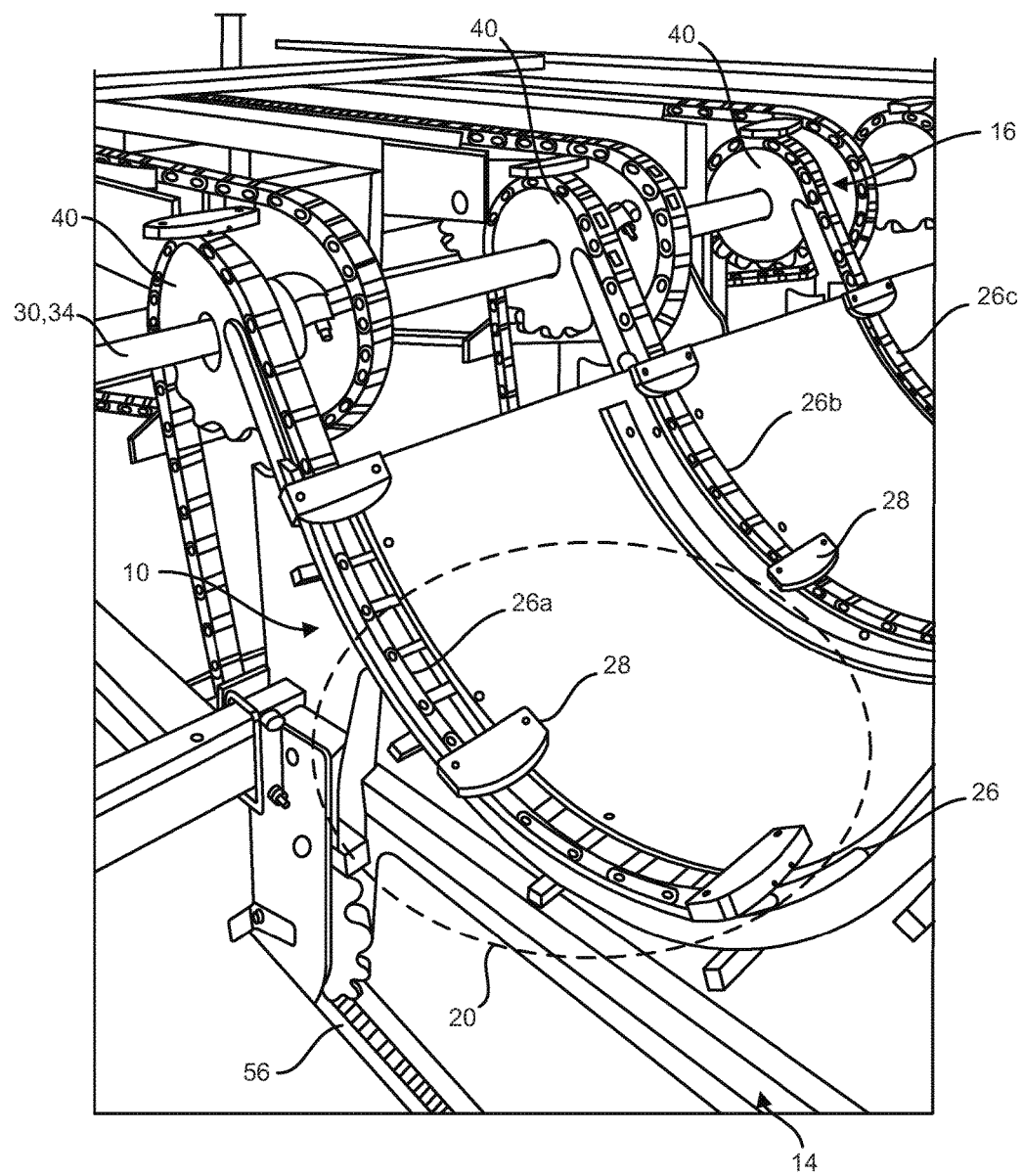
FIG. 13 is a picture showing the board unscrambler of FIG. 2 according to another perspective also showing part of an upstream conveyor.

Also referring to FIGS. 13-14, the driving mechanism 58 may comprise additional drive shafts (not shown and/or with no reference number) defining axes (not shown and/or with no reference number) for receiving additional geared wheels (not shown and/or with no reference number). These additional geared wheels have the purpose of driving or guiding the driving chains 26 along a return path away from the conveyor surface 29.

Location of the first drive shaft 30 may vary. Feeding of the U-shaped accumulator portion 20 with boards 12 may be performed with aid of the driving chains 26 or with aid of a conveyor mechanism of the upstream conveyor 42 and/or gravity effect. FIG. 13 shows an embodiment wherein the boards 12 are pushed down in the U-shaped accumulator portion 20 by the stop wedges 28 as they reach the entrance 16 of the board unscrambler 10.

Each one of the plurality of driving chains 26a, 26b, 26c, 26d, 26e includes a plurality of regularly spaced apart stop wedges 28 to cooperate with (to transport individually or in groups as it will be described below) the plurality of boards 12 from the U-shaped accumulator portion 20 towards the slope portion 22 (from the entrance 16 towards the exit 18 of the frame 14). The plurality of driving chains 26 are powered by the driving mechanism 58 such as to provide the plurality of regularly spaced apart stop wedges 28 (the five spaced apart stop wedges 28a, 28b, 28c, 28d, 28e of the five parallel driving chains 26a, 26b, 26c, 26d, 26e, as shown in FIG. 2) to travel at the same level about the frame 14 in a way to allow the plurality of boards 12 to travel from the U-shaped accumulator portion 20 entrance 16 towards the exit 18 in a predefined orientation (substantially perpendicularly to the conveyor surface 29 and parallel, according to their longitudinal orientation, to the exit 18 of the frame 14); that is, the stop wedges 28a, 28b, 28c, 28d, 28e mounted on respective ones of the driving chains 26a, 26b, 26c, 26d, 26e are horizontally aligned.

Each one of the plurality of regularly spaced apart stop wedges 28 may include a projection outwardly extending from the respective ones of the plurality of driving chains 26a, 26b, 26c, 26d, 26e (parallel driving chains 26). The projection may be integrally formed with the plurality of driving chains 26 or may be connected driving chains 26 using known connection techniques.

The distance between two regularly spaced apart stop wedges 28 on a driving chain 26 may substantially be the width of one, two, three, four or more board(s) 12 such as to allow the one or more board(s) 12 to be pushed by the plurality of regularly spaced apart stop wedges 28 that are travelling along with the conveyor 24. A proposed configuration is based on the dimensions of the boards 12, dimensions of the U-shaped accumulator portion 20 and power of the driving motor for instance.

The driving chains 26 are mounted in such a way to adopt at least part of the shape of the frame 14, preferably a displacement path defined substantially from at least the bottom of the U-shaped accumulator portion 20 to the exit 18 of the frame 14, moreover preferably from the entrance 16 of the U-shaped accumulator portion 20 to the exit 18. Commonly known techniques may be used for the driving chains 26 to marry at least sections of the frame 14, such as driving channels or stop wedges 28 having a portion sliding over part of the frame 14. Shown on FIG. 13, the driving chains 26 may naturally adopt the shape of a portion of the frame 14 when sliding over the frame 14, with the married portion of the frame 14 acting as a rail guiding the driving chains 26 and preventing the chains from "derailing" as lateral forces may be applied on the driving chains 26 by the boards 12. The shape of unguided portions of the driving chains 26 may be determined by natural tension and/or may depend on additional wheels guiding the driving chains 26 according to a desired path, for instance passing under the conveyor surface 29. Since the first drive shaft 30 and the second drive shaft 32 are linked by shaft-driving chains 62 and rotate synchronously, the length of the driving chains 26 between the entrance and the exit on the conveyor surface 29 stays mostly constant and the driving chain 26 is kept pressed on the rail at the bottom of the U-shaped accumulator portion 20.

Figure 3:
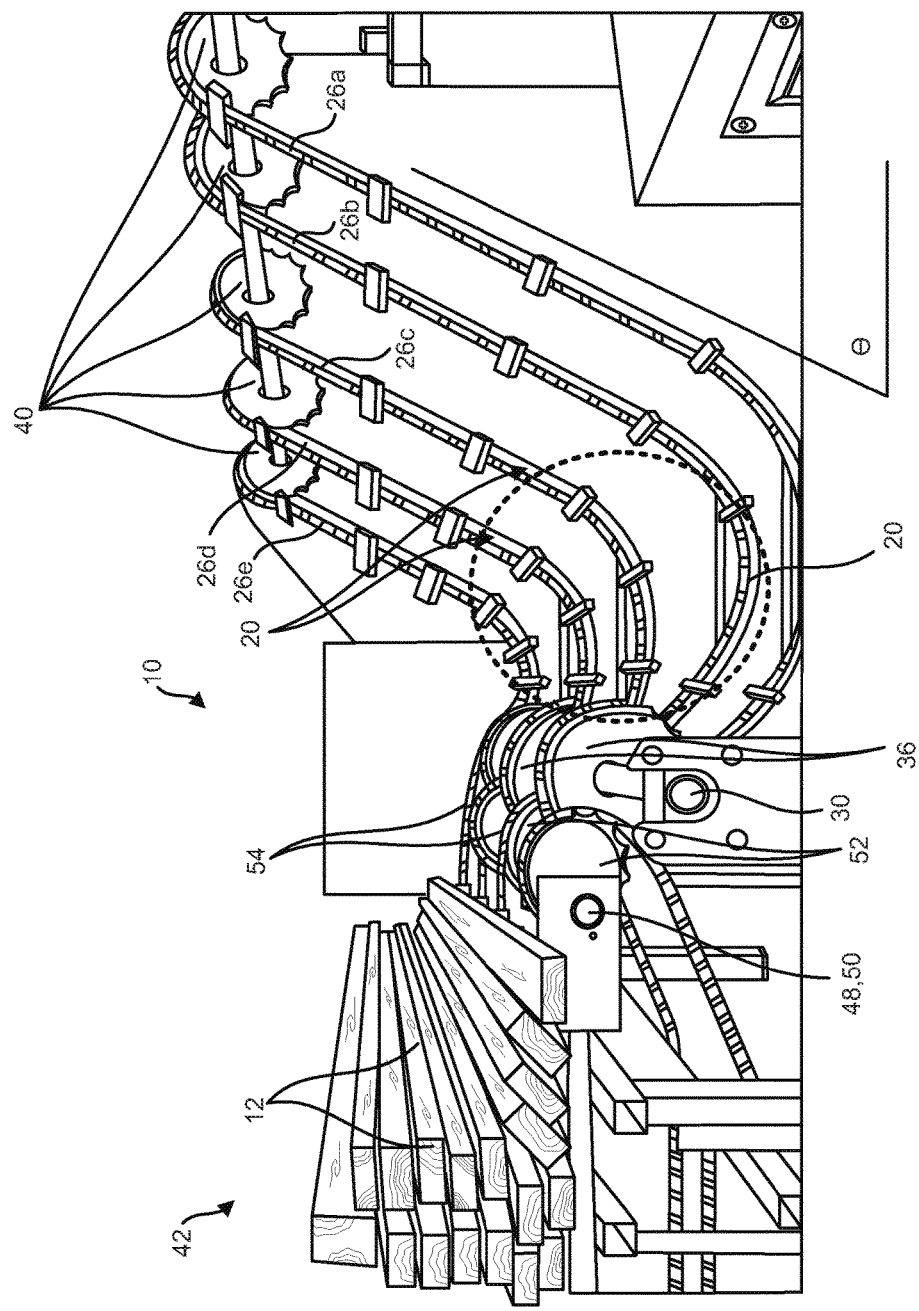
FIGS. 3-11 are pictures showing the board unscrambler of FIG. 2 in operation.

Referring particularly to FIG. 3, the U-shaped accumulator portion 20 typically defines a radius of curvature R of about between 0.1 meters and 3 meters so as to receive and to accumulate a sufficient number of boards 12 that needs to be sorted. According to another embodiment, the radius of curvature R is between 0.5 meters and 2.5 meters. According to another embodiment, the radius of curvature R is between 1.0 meter and 2.0 meters. According to another embodiment, the radius of curvature R is between 1.25 meters and 1.75 meters.

The U-shaped accumulator portion 20 is for receiving a plurality of boards 12 that are coming from a previous operation. The U-shaped accumulator portion 20 is therefore for receiving a plurality of boards 12 that are coming from the upstream conveyor 42. A driving chain 44 that drives the upstream conveyor 42 about its frame 46 is powered by a driving mechanism 58 (which can be distinct from the driving mechanism 58). The driving mechanism 58 includes a motor 60 and a third drive shaft 48 about the entrance 16 that defines a third axis 50. The third axis 50 is distant from the first axis 34. The third drive shaft 48 receives a plurality of third geared wheels 52 to rotate about that third axis 50 for meshing with the driving chain 44, thereby driving the upstream conveyor 42 about the frame 46. As best shown in FIG. 3, the frame 46 further includes a plurality of guides 54 for guiding the plurality of boards 12 that are travelling from the upstream conveyor 42 to fall within the U-shaped accumulator portion 20 located below the level of the upstream conveyor 42.

FIG. 15 illustrates an embodiment wherein the same driving mechanism 58 is used to drive the board unscrambler 10 and a downstream conveyor 64 receiving boards 12 once they exit the board unscrambler 10.

Returning to FIG. 3, the slope portion 22 defines an angle θ of typically about between 40° and 80° relative to the ground surface (not shown). The purpose of the slope portion 22 that has a predetermined angle θ relative to the ground surface is to compel the boards 12 not mating with the stop wedges 28 (or with another board 12 that cooperates with the stop wedges 28) to fall back by gravity effect in the U-shaped accumulator portion 20. According to another embodiment, angle θ is between 45° and 75° relative to the ground surface. According to another embodiment, angle θ is between 50° and 70° relative to the ground surface. According to another embodiment, angle θ is between 55° and 65° relative to the ground surface. According to another embodiment, angle θ is between 70° and 75° relative to the ground surface. According to another embodiment, angle θ is between 75° and 80° relative to the ground surface.

FIGS. 3-11 show the board unscrambler 10 in operation. FIG. 3 shows that the plurality of boards 12 to be sorted are laying on the upstream conveyor 42; the stack of boards 12 coming from a previous process. It is to be mentioned that the upstream conveyor 42 may be continuously transporting the plurality of boards 12 towards the U-shaped accumulator portion 20, or may be punctually or periodically transporting boards 12 towards the entrance 16, and as a result in the U-shaped accumulator portion 20.

Figure 4:
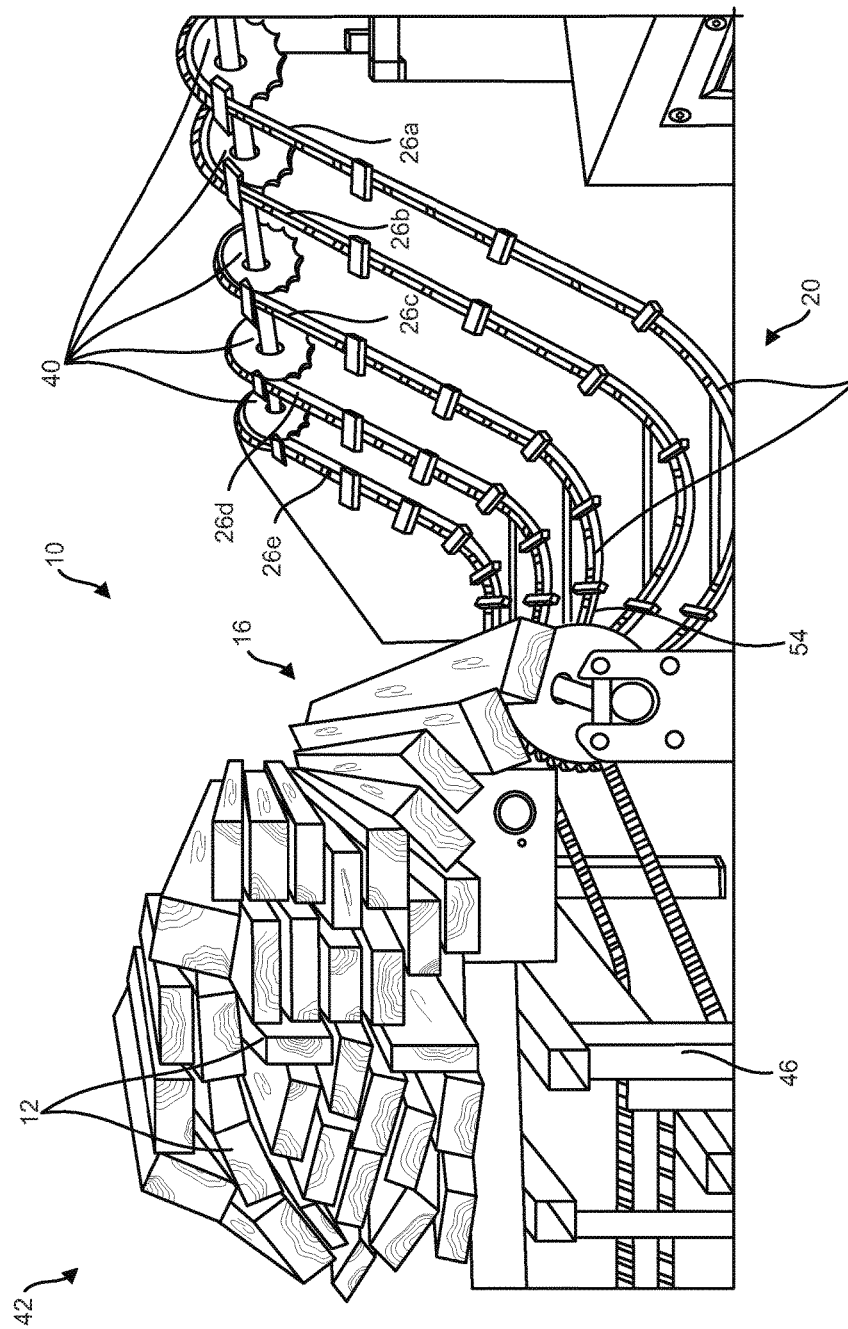
Figure 5:
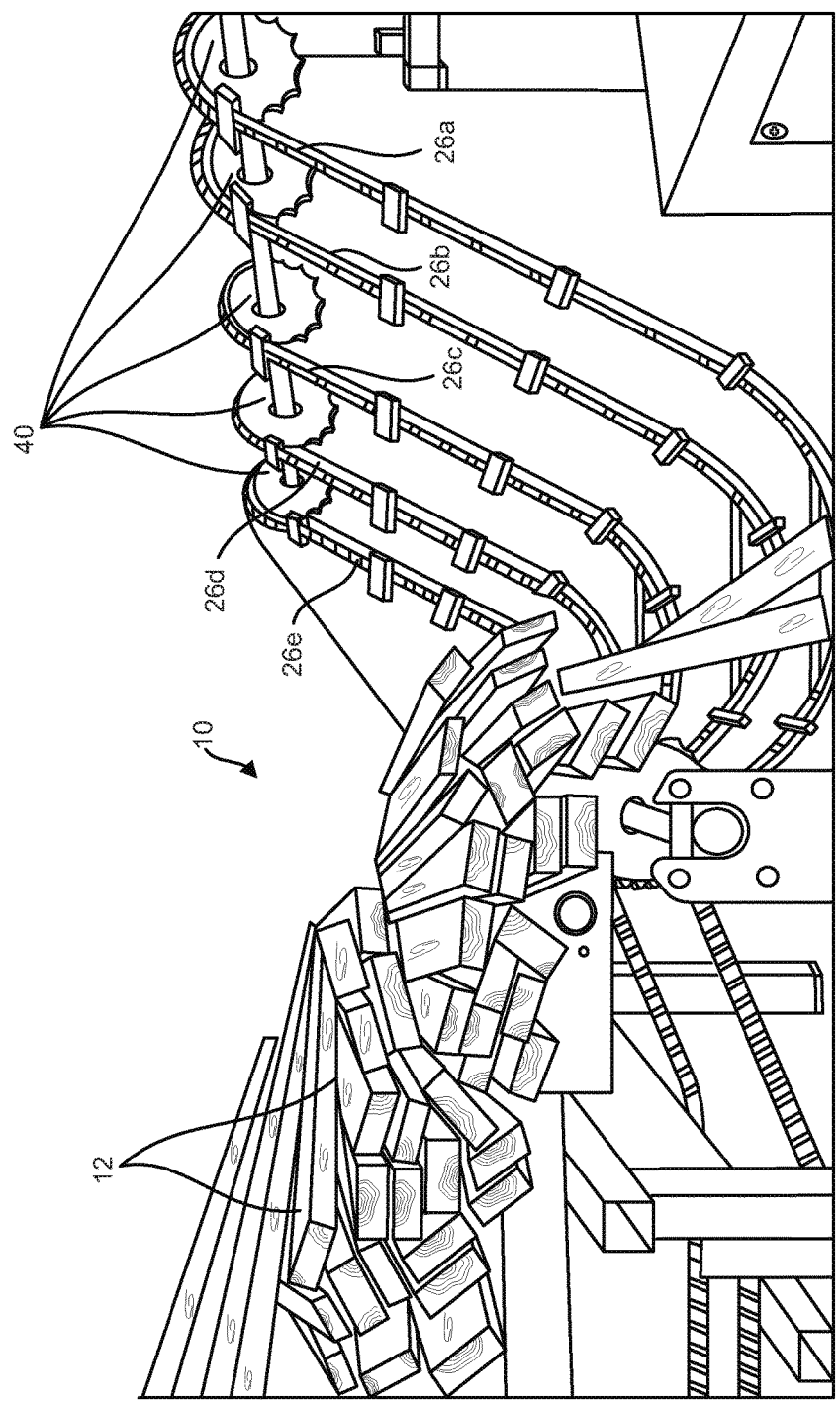

FIGS. 4-5 show that the upstream conveyor 42 is in operation mode transporting the boards 12 towards the entrance 16 of the board unscrambler 10. The boards 12 (shown in a stack) will follow the plurality of guides 54 extending from the frame 46 and fall, helped by gravity, within the U-shaped accumulator portion 20 following the conveyor surface 29 as they pass the entrance 16.

Figure 6:
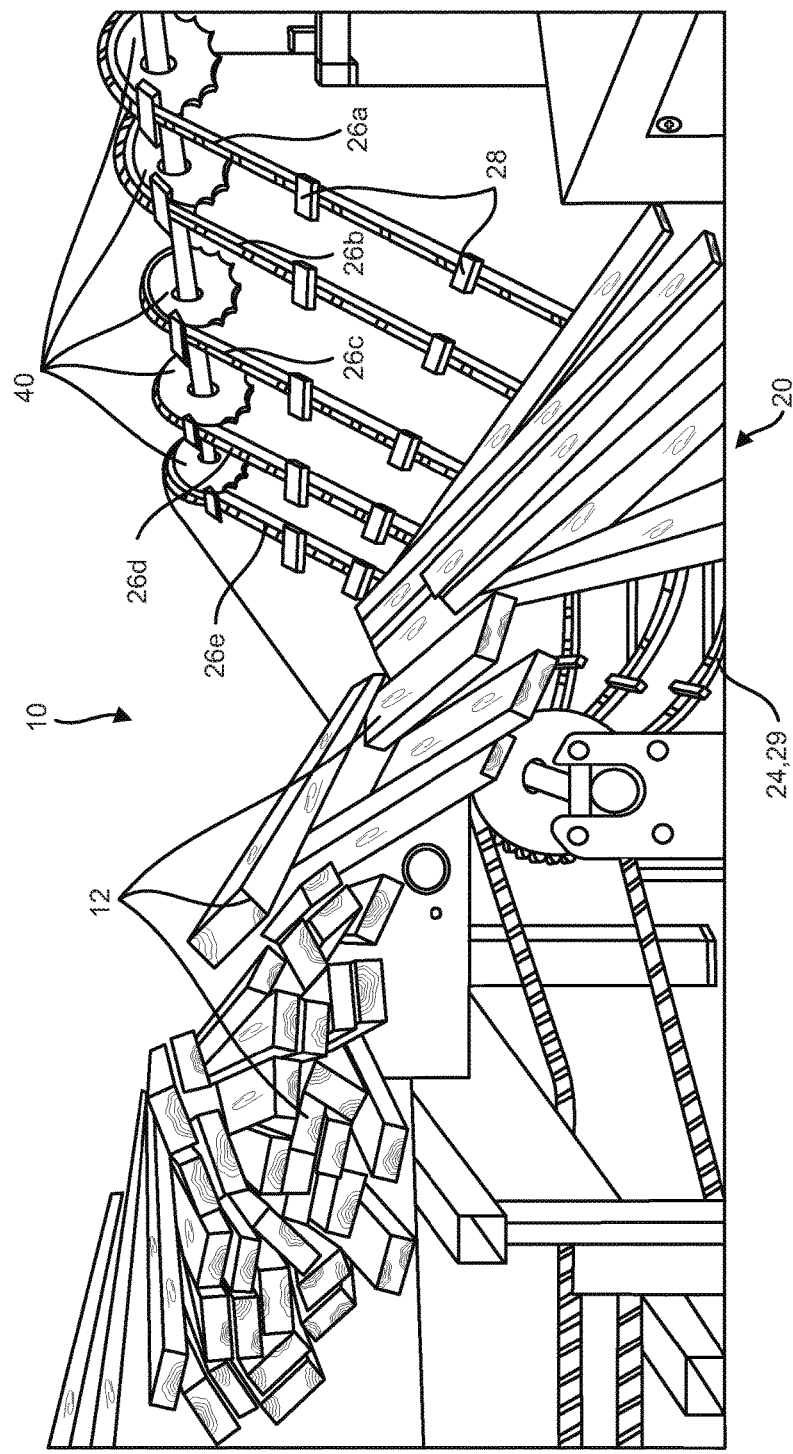

FIG. 6 shows that some of the boards 12 that are laying on the conveyor surface 29 within the U-shaped accumulator portion 20 will enter in direct contact with the stop wedges 28, and thereby be displaced by the plurality of regularly spaced apart stop wedges 28, while some will be indirectly pushed by the other boards 12 that are cooperating with the stop wedges 28.

Figure 7:
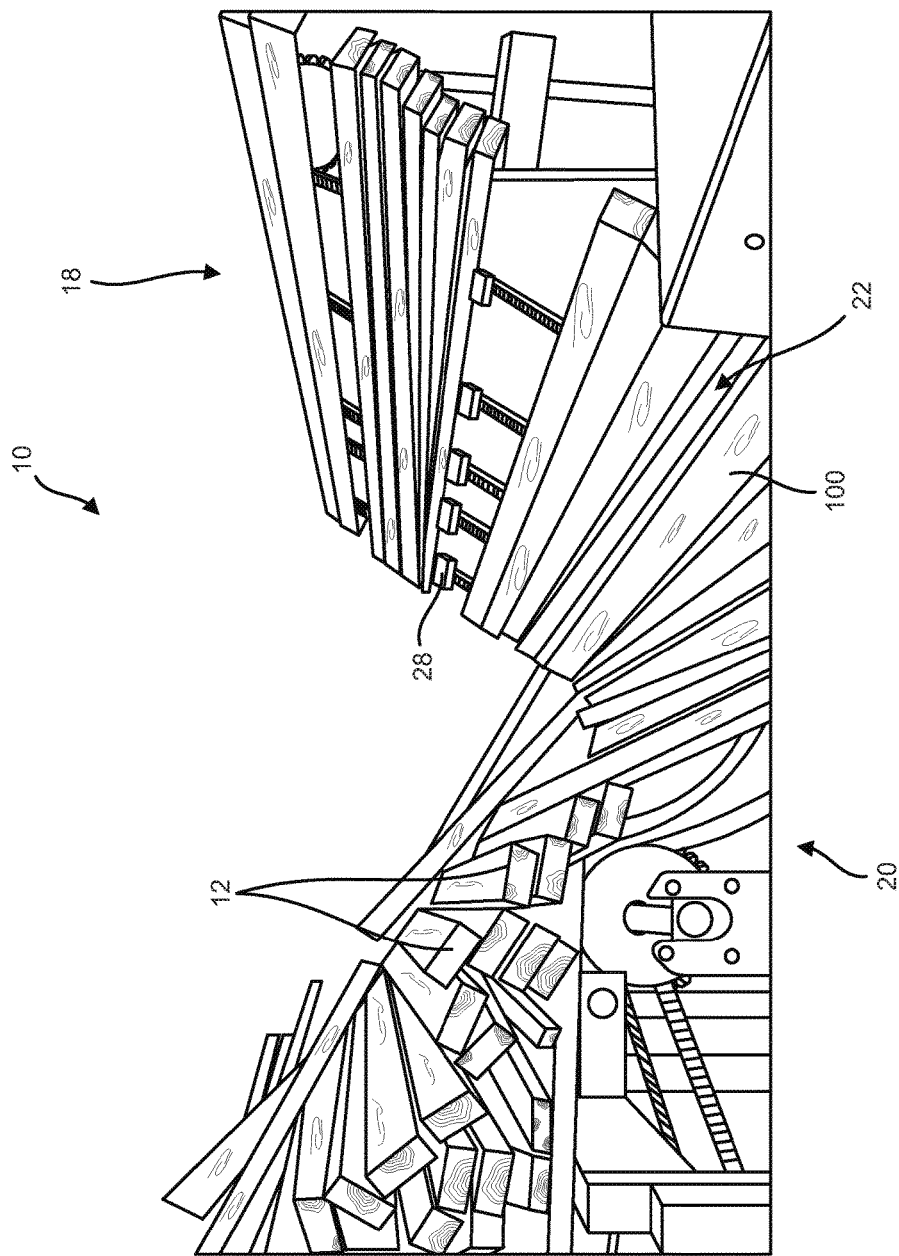
Figure 8:
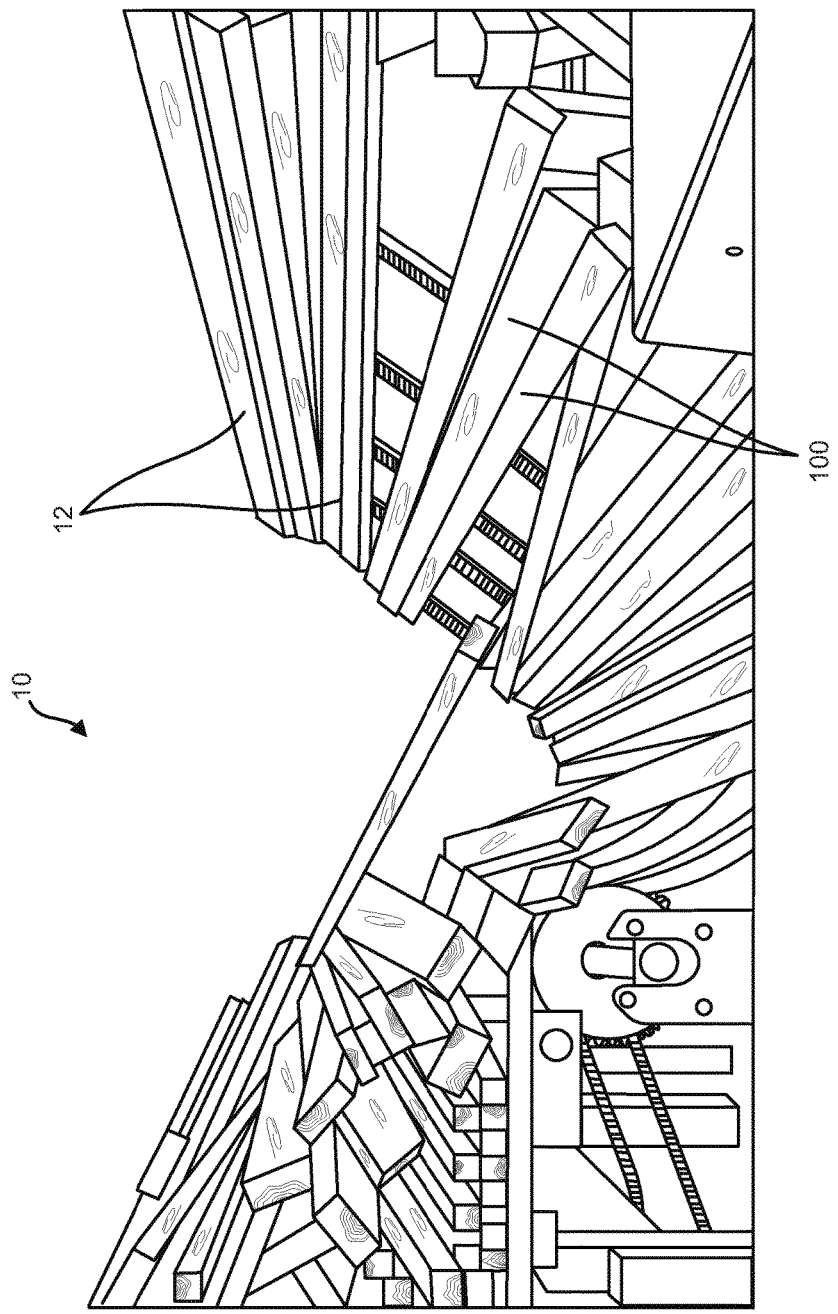
Figure 9:
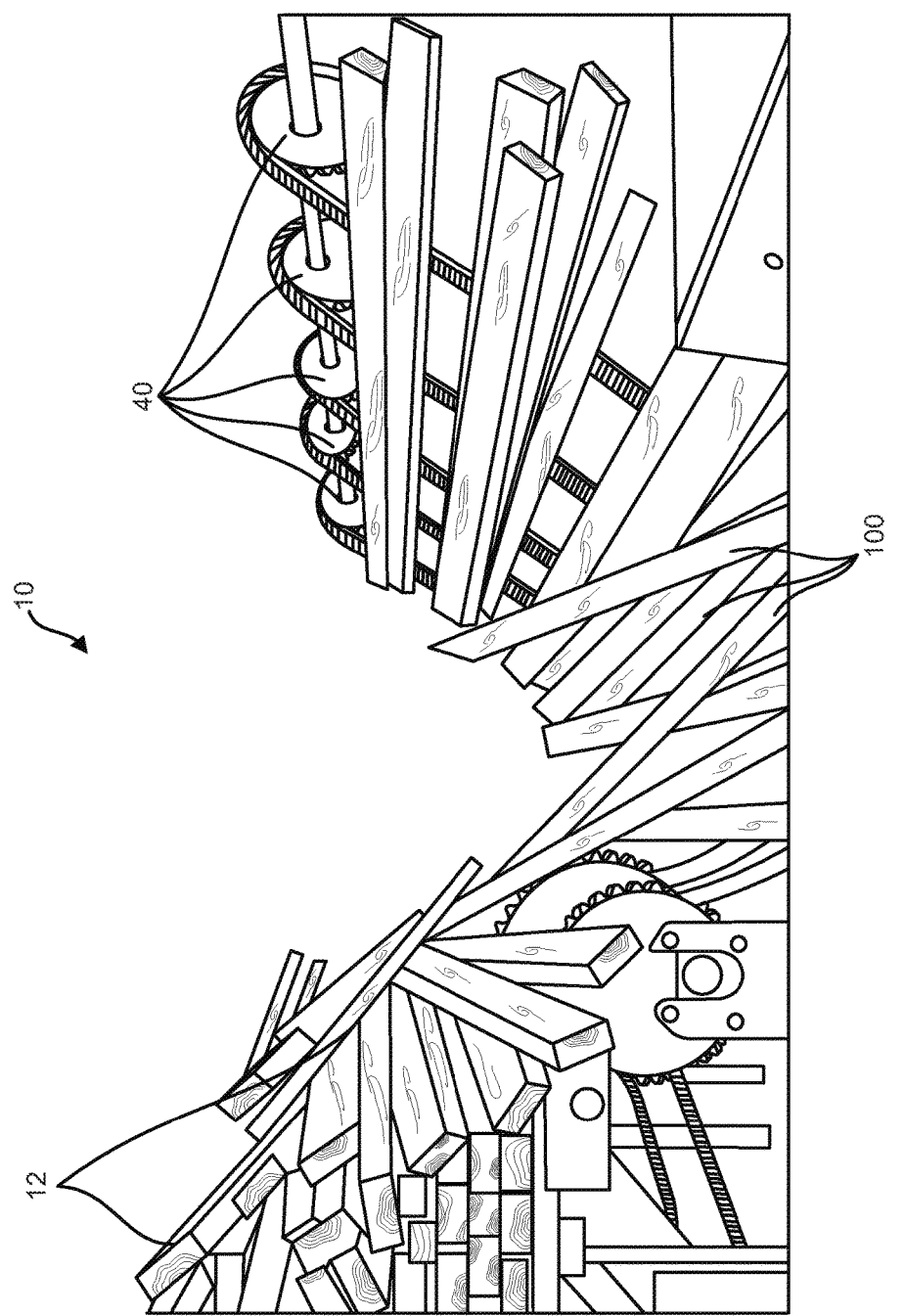
Figure 10:
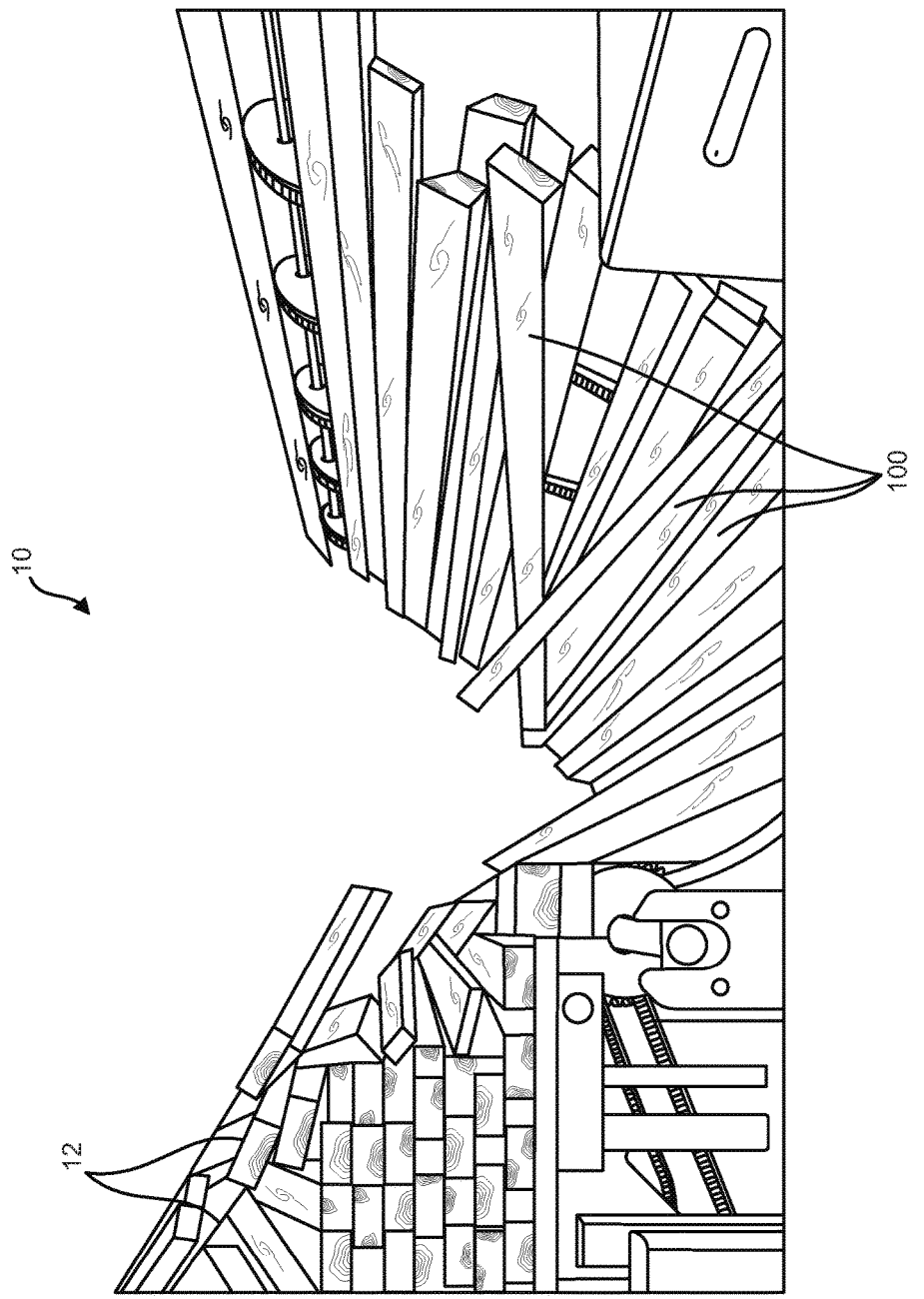
Figure 11:
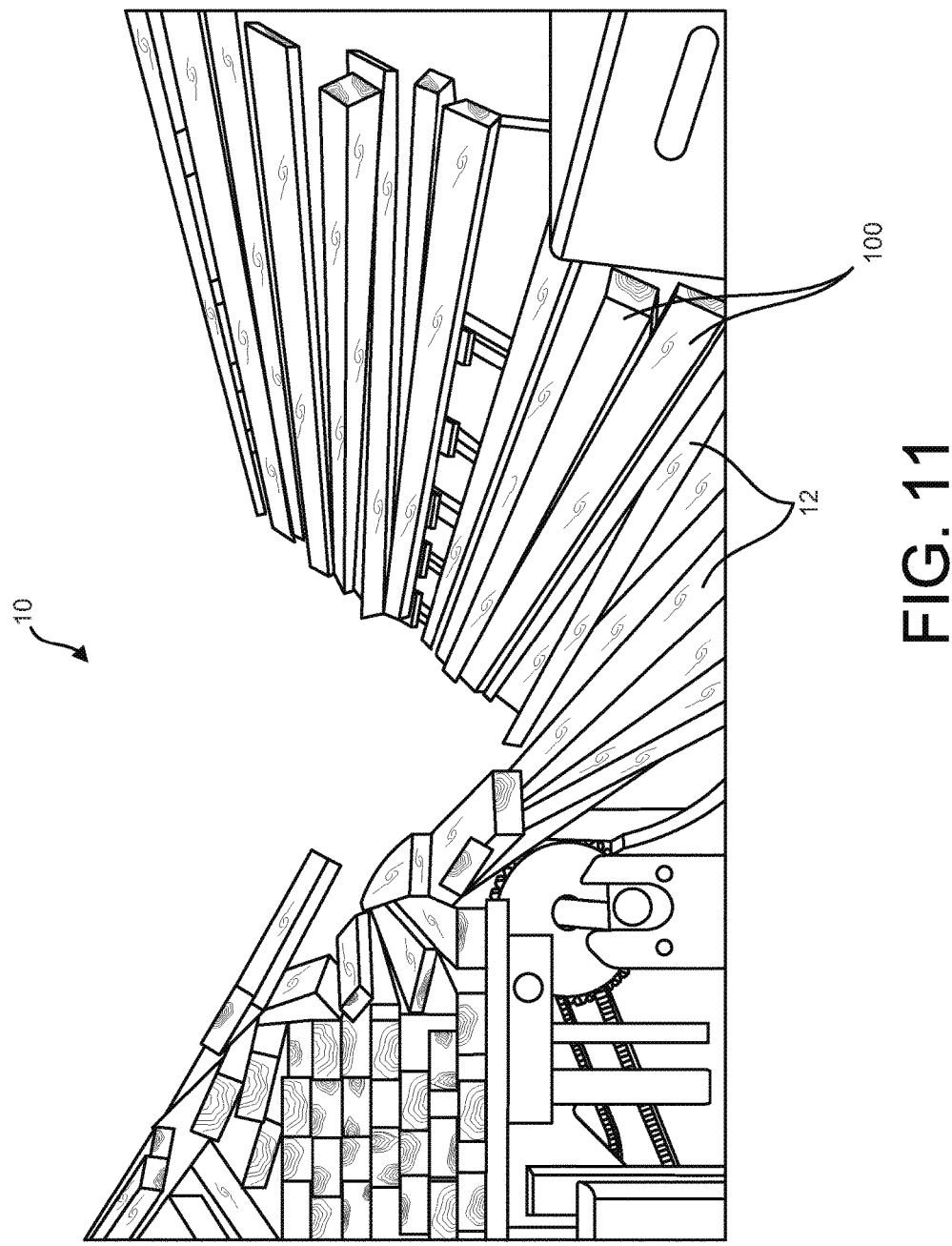
Figure 12:
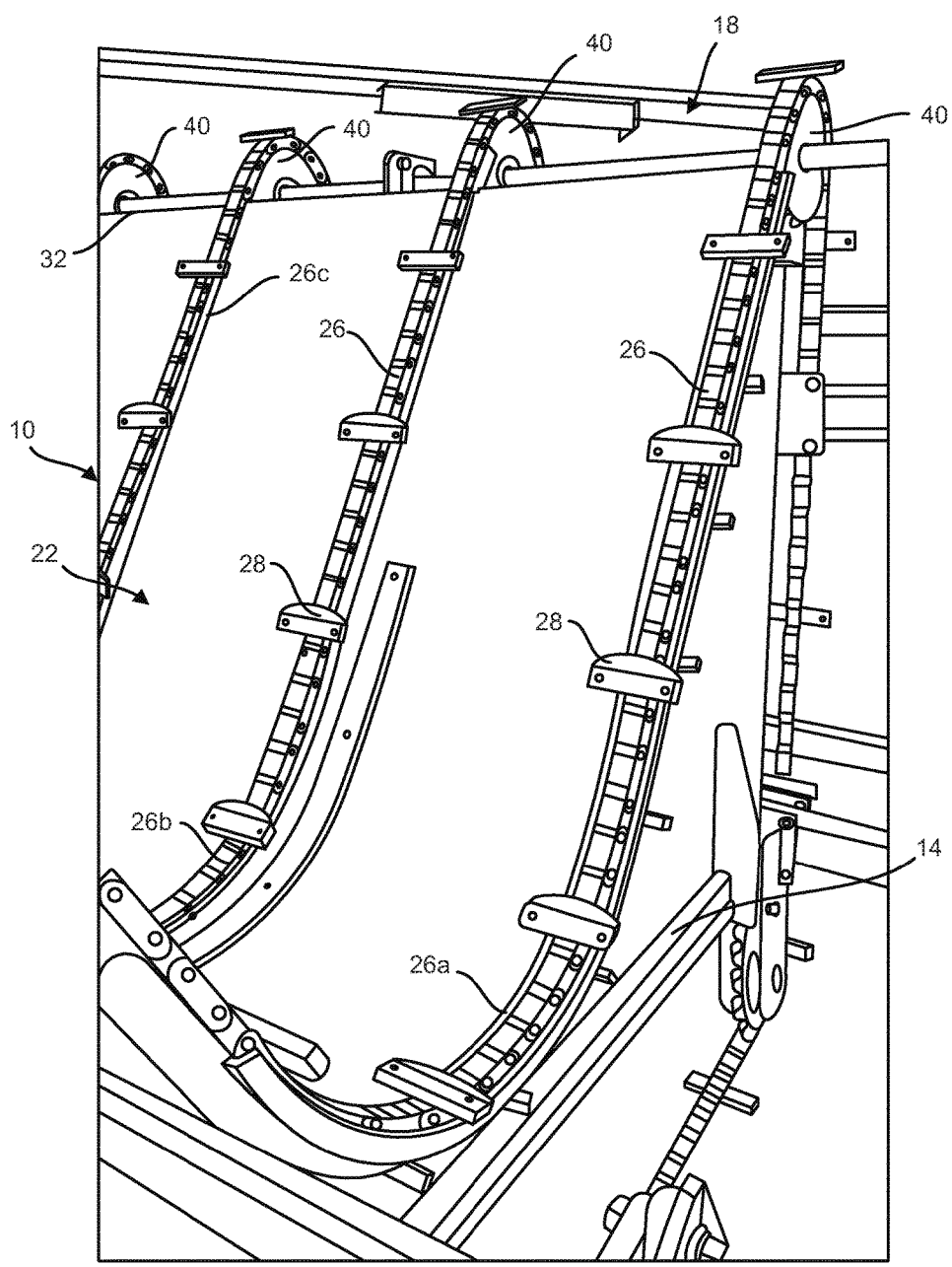
FIG. 12 is a picture showing the board unscrambler of FIG. 2 according to another perspective.

FIG. 7 shows when some boards 12 have been transported from the U-shaped accumulator portion 20 to the slope portion 22, about to actually reach the exit 18 of the board unscrambler 10. These boards 12 will be guided towards another station to be subject to a subsequent processing step. FIGS. 7-11 further show that boards 100 that are not directly or indirectly mating and/or cooperating with the stop wedges 28 will fall (by gravity effect caused by the angle θ) back within the U-shaped accumulator portion 20. Accordingly, they become available to be driven up the longitudinal slope portion 22 upon directly or indirectly mating the stop wedges 28 at a pass of subsequent "upstream" stop wedges 28.

It is to be noted that the board unscrambler 10 may further include sensors (not shown) as an aid in performing monitoring operations such as counting the number of boards 12 passing through the board unscrambler 10, registering the width and/or length of the boards 12 passing through the board unscrambler 10, registering the color or other physical characteristic of the boards 12 passing through the board unscrambler 10, and/or the like. A feedback signal can then be sent to the upstream conveyor 42 in order to control its speed. If the board unscrambler 10 can accommodate more boards, the speed of the upstream conveyor will be increased while, on the other hand, if the board unscrambler 10 is already full, the speed of the upstream converter 42 will be reduced.

It is to be noted that the frame 14, the U-shaped accumulator portion 20, the slope portion 22, the conveyor 24, the driving chains 26, the regularly spaced apart stop wedges 28, and the driving mechanism 58 may adopt alternative configurations (sizes, angles, relative parameters) while respecting the objectives herein described.

Specifically, the U-shaped accumulator portion 20 is adapted to receive a plurality of boards 12 and at the same time to provide the board unscrambler 10 with an increased efficiency. That increased efficiency includes having more boards 12 that can be sorted in a given period compared to the prior art apparatuses and providing improved and/or regulated performance with an upstream conveyor 42 punctually or periodically transporting boards 12.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A board unscrambler adapted for unscrambling boards comprising:
a frame having an entrance and an exit for the boards, the frame comprising:
a U-shaped accumulator portion in which the boards accumulate after the entrance, the U-shaped accumulator portion having a lowermost point and sloped surfaces on both sides of the lowermost point; and
an upward slope portion between the U-shaped accumulator portion and the exit; and
a powered conveyor comprising:
driving chains;
rails guiding the driving chains; and
catches mounted to the driving chains for carrying forward the boards along the frame from the U-shaped accumulator portion through the upward slope portion toward the exit;
wherein boards which are not directly or indirectly carried forward by the catches will fall back in the U-shaped accumulator portion thereby resulting in an unscrambling of the boards which are carried forward.

2. The board unscrambler of claim 1, wherein the upward slope portion is substantially longitudinal.

3. The board unscrambler of claim 1, wherein the upward slope portion comprises a curved portion.

4. The board unscrambler of claim 1, wherein the upward slope portion is a direct and immediate continuation of the U-shaped accumulator portion.

5. The board unscrambler of claim 1, wherein the upward slope portion forms part of and is integrated with the U-shaped accumulator portion.

6. The board unscrambler of claim 1, wherein the catches have a substantial longitudinal shape having a longitudinal direction which is substantially parallel to the boards.

7. The board unscrambler of claim 1, wherein the driving chains are parallel to each other and in a direction which is perpendicular to the entrance and the exit wherein the entrance and the exit extends laterally and are substantially parallel to each other.

8. The board unscrambler of claim 1, wherein the catches mounted on respective ones of the driving chains are horizontally aligned.

9. The board unscrambler of claim 1, wherein the catches have a substantial longitudinal shape having a longitudinal direction which is substantially parallel to the boards and the catches are mounted across more two or more driving chains.

10. The board unscrambler of claim 1, wherein the powered conveyor further comprises a drive shaft and geared wheels which are spaced apart on the drive shaft, and wherein the driving chains ride on the geared wheels.

11. The board unscrambler of claim 1, further comprising a motor driving the powered conveyor.

12. The board unscrambler of claim 10, wherein the motor driving the powered conveyor is connected to the drive shaft thereby driving the geared wheels.

13. The board unscrambler of claim 1, wherein the U-shaped accumulator portion has a radius of curvature R of about between 0.1 meters and 3 meters.

14. The board unscrambler of claim 13, wherein the radius of curvature R is constant.

15. The board unscrambler of claim 1, wherein the entrance is at a first elevation, and the exit is at a second elevation, and wherein the second elevation is greater than the first elevation.

16. The board unscrambler of claim 1, wherein the upward slope portion defines an angle of about between 40° and 80° relative to the horizontal.

17. The board unscrambler of claim 1, wherein the catches have a top longitudinal side adapted to interface with the boards, wherein the top longitudinal side has an non-planar surface.

18. A method of unscrambling boards comprising:
providing boards perpendicularly to a forward direction of movement of the boards;
accumulating boards in a U-shaped accumulator, wherein the U-shaped accumulator has a lowermost point and sloped surfaces on both sides of the lowermost point; and
a conveyor comprising driving chains, rails guiding the driving chains, and catches mounted to the driving chains catching at least some boards for carrying them forward on an upward slope still perpendicularly to a forward direction of movement of the boards;
wherein boards which are not directly or indirectly carried forward by the catches will fall back from the upward slope or remain in the U-shaped accumulator thereby resulting in an unscrambling of the boards which are carried forward.

19. A board unscrambler adapted for unscrambling boards comprising:
guides defining a conveyor surface comprising:
a U-shaped accumulator in which the boards accumulate after entering the board unscrambler, the U-shaped accumulator having a lowermost point and sloped surfaces on both sides of the lowermost point;
an upward slope after the U-shaped accumulator; and
a powered conveyor comprising catches for carrying forward the boards from the U-shaped accumulator through the upward slope;
wherein boards which are not directly or indirectly carried forward by the catches will fall back from the upward slope or remain in the U-shaped accumulator thereby resulting in an unscrambling of the boards which are carried forward.

* * * * *